United States Patent
Zhao et al.

(10) Patent No.: US 11,283,818 B2
(45) Date of Patent: *Mar. 22, 2022

(54) CONTAINER FILE ANALYSIS USING MACHINE LEARNING MODEL

(71) Applicant: Cylance Inc., Irvine, CA (US)

(72) Inventors: Xuan Zhao, Irvine, CA (US); Matthew Wolff, Laguna Niguel, CA (US); John Brock, Irvine, CA (US); Brian Michael Wallace, Irvine, CA (US); Andy Wortman, Irvine, CA (US); Jian Luan, Irvine, CA (US); Mahdi Azarafrooz, Irvine, CA (US); Andrew Davis, Portland, OR (US); Michael Thomas Wojnowicz, Irvine, CA (US); Derek A. Soeder, Irvine, CA (US); David N. Beveridge, Portland, OR (US); Yaroslav Oliinyk, Portland, OR (US); Ryan Permeh, Laguna Hills, CA (US)

(73) Assignee: Cylance Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,026

(22) Filed: Apr. 28, 2020

(65) Prior Publication Data

US 2020/0259850 A1 Aug. 13, 2020

Related U.S. Application Data

(63) Continuation of application No. 15/345,444, filed on Nov. 7, 2016, now Pat. No. 10,637,874.

(Continued)

(51) Int. Cl.
*H04L 29/06* (2006.01)
*G06N 3/08* (2006.01)
(Continued)

(52) U.S. Cl.
CPC ........ *H04L 63/1416* (2013.01); *G06F 21/552* (2013.01); *G06F 21/562* (2013.01);
(Continued)

(58) Field of Classification Search
CPC ... H04L 63/14; H04L 63/1416; G06F 21/552; G06F 21/562; G06N 20/10; G06N 3/0454; G06N 3/08
See application file for complete search history.

(56) References Cited

U.S. PATENT DOCUMENTS

| 7,395,436 B1 | 7/2008 | Nemovicher |
| 7,739,738 B1 | 6/2010 | Sobel et al. |

(Continued)

FOREIGN PATENT DOCUMENTS

| WO | 02/10888 A2 | 2/2002 |
| WO | 2002/010888 A2 | 2/2002 |
| WO | 2018/045165 A1 | 3/2018 |

OTHER PUBLICATIONS

Kuriakose et al., "Metamorphic virus detection using feature selection techniques," in 2014 5th International Conference on Computer and Communication Technology (CCCT), IEEE, pp. 141-146 (2014).

(Continued)

*Primary Examiner* — Theodore C Parsons
(74) *Attorney, Agent, or Firm* — Jones Day

(57) ABSTRACT

A system is provided for training a machine learning model to detect malicious container files. The system may include at least one processor and at least one memory. The memory may include program code which when executed by the at least one processor provides operations including: processing a container file with a trained machine learning model, wherein the trained machine learning is trained to determine a classification for the container file indicative of whether the container file includes at least one file rendering the (Continued)

container file malicious; and providing, as an output by the trained machine learning model, an indication of whether the container file includes the at least one file rendering the container file malicious. Related methods and articles of manufacture, including computer program products, are also disclosed.

24 Claims, 6 Drawing Sheets

Related U.S. Application Data

(60) Provisional application No. 62/382,716, filed on Sep. 1, 2016.

(51) Int. Cl.
  *G06F 21/55* (2013.01)
  *G06F 21/56* (2013.01)
  *G06N 20/10* (2019.01)
  *G06N 3/04* (2006.01)

(52) U.S. Cl.
  CPC ............. *G06N 3/0454* (2013.01); *G06N 3/08* (2013.01); *G06N 20/10* (2019.01)

(56) References Cited

U.S. PATENT DOCUMENTS

| | | | |
|---|---|---|---|
| 8,301,904 | B1 | 10/2012 | Gryaznov et al. |
| 8,402,543 | B1 | 3/2013 | Ranjan et al. |
| 9,122,739 | B1 | 9/2015 | Yadwadkar et al. |
| 9,292,688 | B2 | 3/2016 | Avasarala et al. |
| 9,690,938 | B1 | 6/2017 | Saxe et al. |
| 9,691,027 | B1 | 6/2017 | Sawant et al. |
| 9,781,144 | B1 | 10/2017 | Otvagin et al. |
| 9,922,033 | B1 | 3/2018 | Odedra |
| 10,366,053 | B1 | 7/2019 | Zheng et al. |
| 2003/0212913 | A1 | 11/2003 | Vella |
| 2007/0028304 | A1* | 2/2007 | Brennan ............... H04L 63/14 726/24 |
| 2007/0233735 | A1 | 10/2007 | Han et al. |
| 2007/0233753 | A1 | 10/2007 | Taniguchi et al. |
| 2007/0240221 | A1 | 10/2007 | Tuvell et al. |
| 2011/0032338 | A1 | 2/2011 | Raveendran et al. |
| 2012/0323829 | A1* | 12/2012 | Stokes ............... G06K 9/6224 706/12 |
| 2013/0185230 | A1 | 7/2013 | Zhu et al. |
| 2014/0090061 | A1 | 3/2014 | Avasarala et al. |
| 2014/0180934 | A1 | 6/2014 | Surdeanu et al. |
| 2015/0058982 | A1 | 2/2015 | Eskin et al. |
| 2015/0339570 | A1 | 11/2015 | Scheffler |
| 2016/0028761 | A1 | 1/2016 | Sitsky et al. |
| 2016/0335435 | A1 | 11/2016 | Schmidtler et al. |
| 2016/0342888 | A1 | 11/2016 | Yang et al. |
| 2017/0017793 | A1 | 1/2017 | Davis et al. |
| 2017/0180346 | A1 | 6/2017 | Suarez et al. |
| 2017/0206434 | A1 | 7/2017 | Murali et al. |
| 2017/0206470 | A1 | 7/2017 | Marculescu et al. |
| 2017/0262633 | A1 | 9/2017 | Miserendino et al. |
| 2017/0270653 | A1 | 9/2017 | Garnavi et al. |
| 2017/0372071 | A1 | 12/2017 | Saxe |
| 2018/0007074 | A1 | 1/2018 | Kune et al. |
| 2018/0041536 | A1 | 2/2018 | Berlin et al. |

OTHER PUBLICATIONS

Tabish et al., "Malware detection using statistical analysis of byte-level file content," in Proceedings of the ACM SIGKDD Workshop on CyberSecurity and Intelligence Informatics, pp. 23-31, 2009. (2009).

Vinod et al., "Reform: Relevant features for malware analysis," in 2012 26th International Conference on Advanced Information Networking and Applications Workshops, IEEE, pp. 738-744 (2012).

U.S. Appl. No. 62/369,984, filed Aug. 2, 2016.

Ujjwalkarn, "An Intuitive Explanation of Convolutional Neural Networks," The Data Science Blog, (2016). (http://ujjwalkarn.me/2016/08/11/intuitive-explanation-convnets/).

International Search Report for International Application No. PCT/US2017/049607, dated Oct. 25, 2017 (4 pages).

Peng et al., "Cross-layer features in convolutional neural networks for generic classification tasks," 2015 IEEE International Conference, pp. 1-13 (2015). (accesed Sep. 2019, http://ieeexplore.ieee.org/document/7351365).

Lanzi et al., "AccessMiner: Using System-Centric Models for Malware Protection," CCS 2010, pp. 1-14, Oct. 4-8, 2010.

Tobiyama et al., "Malware Detection with Deep Neural Network Using Process Behavior," 2016 IEEE 40th Annual Computer Software and Applications Conference, 577-582 (2016).

Non-Final Office Action issued for U.S. Appl. No. 15/345,444 dated Jun. 21, 2019 (22 pages).

Non-Final Office Action issued for U.S. Appl. No. 15/345,444 dated Feb. 1, 2019 (17 pages).

Non-Final Office Action issued for U.S. Appl. No. 15/345,444 dated Oct. 1, 2018 (15 pages).

Non-Final Office Action issued for U.S. Appl. No. 15/345,444 dated Mar. 30, 2018 (18 pages).

Final Office Action issued for U.S. Appl. No. 15/345,444 dated Oct. 22, 2019 (25 pages).

Final Office Action issued for U.S. Appl. No. 15/345,444 dated Apr. 12, 2019 (21 pages).

Notice of Allowance issued on U.S. Appl. No. 16/663,252 dated Aug. 9, 2021.

* cited by examiner

CONTAINER FILE ANALYSIS USING MACHINE LEARNING MODEL

RELATED APPLICATIONS

This application claims priority to U.S. patent application Ser. No. 15/345,444 filed on Nov. 7, 2016 which, in turn, claims priority to U.S. Pat. App. Ser. No. 62/382,716 filed on Sep. 1, 2016, the disclosure of each of which is incorporated herein by reference in its entirety.

TECHNICAL FIELD

The subject matter described herein relates generally to machine learning and more specifically to the use of neural networks in the classification of container files.

BACKGROUND

A container file may include a plurality of individual files. For instance, an Android object file may include files for different source code and executables. Likewise, an installer file may include multiple files for different executables. Meanwhile, a Java Archive (JAR) file may aggregate multiple Java class files as well as the corresponding metadata and resources (e.g., text, images) into a single package for distribution of application software or libraries on the Java platform. A Mach object (Mach-o) file (e.g., a fat binary file) may include files for object code targeted at different processor architectures. Malicious code may often be concealed in one or more files of an otherwise innocuous container file. The presence of even a single malicious file may render an entire container file malicious.

SUMMARY

Systems, methods, and articles of manufacture, including computer program products, are provided for utilizing a trained machine learning model to detect malicious container files. In some example embodiments, there is provided a system that includes at least one processor and at least one memory. The at least one memory may include program code that provides operations when executed by the at least one processor. The operations may include: processing a container file with a trained machine learning model, wherein the trained machine learning is trained to determine a classification for the container file indicative of whether the container file includes at least one file rendering the container file malicious; and providing, as an output by the trained machine learning model, an indication of whether the container file includes the at least one file rendering the container file malicious.

In some variations, one or more features disclosed herein including the following features can optionally be included in any feasible combination. The at least one file rendering the container file malicious may be a malicious file. The malicious file may be unwanted data, an unwanted portion of a script, and/or an unwanted portion of program code. Alternately or additionally, the at least one file rendering the container file malicious may be a benign file rendering the container file malicious when combined with another benign file from the container file.

In some variations, the trained machine learning model may be a trained neural network. The trained neural network may be a trained convolutional neural network. The container file may be a file that includes a plurality of files. The trained machine learning model may include a pooling layer configured to apply a maximum pooling function to the container file. Applying the maximum pooling function may identify a maximum feature from a plurality of files included in the container file. The operations may further include receiving the container file by at least receiving a plurality of feature vectors. Each of the plurality of feature vectors may include one or more features of a corresponding one of the plurality of files. The trained machine learning model may include a convolution layer configured to generate a first feature map by at least applying a first kernel to a plurality of overlapping groups of feature vectors. Applying the first kernel may include computing a dot product between features included in the first kernel and features included in a first overlapping group of feature vectors to generate a first entry in the first feature map, and computing another dot product between features included in the first kernel and features included in a second overlapping group of feature vectors to generate a second entry in the first feature map. The computing of the dot product and the other dot product may detect a presence of the features included in the first kernel in the first and second overlapping group of feature vectors.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
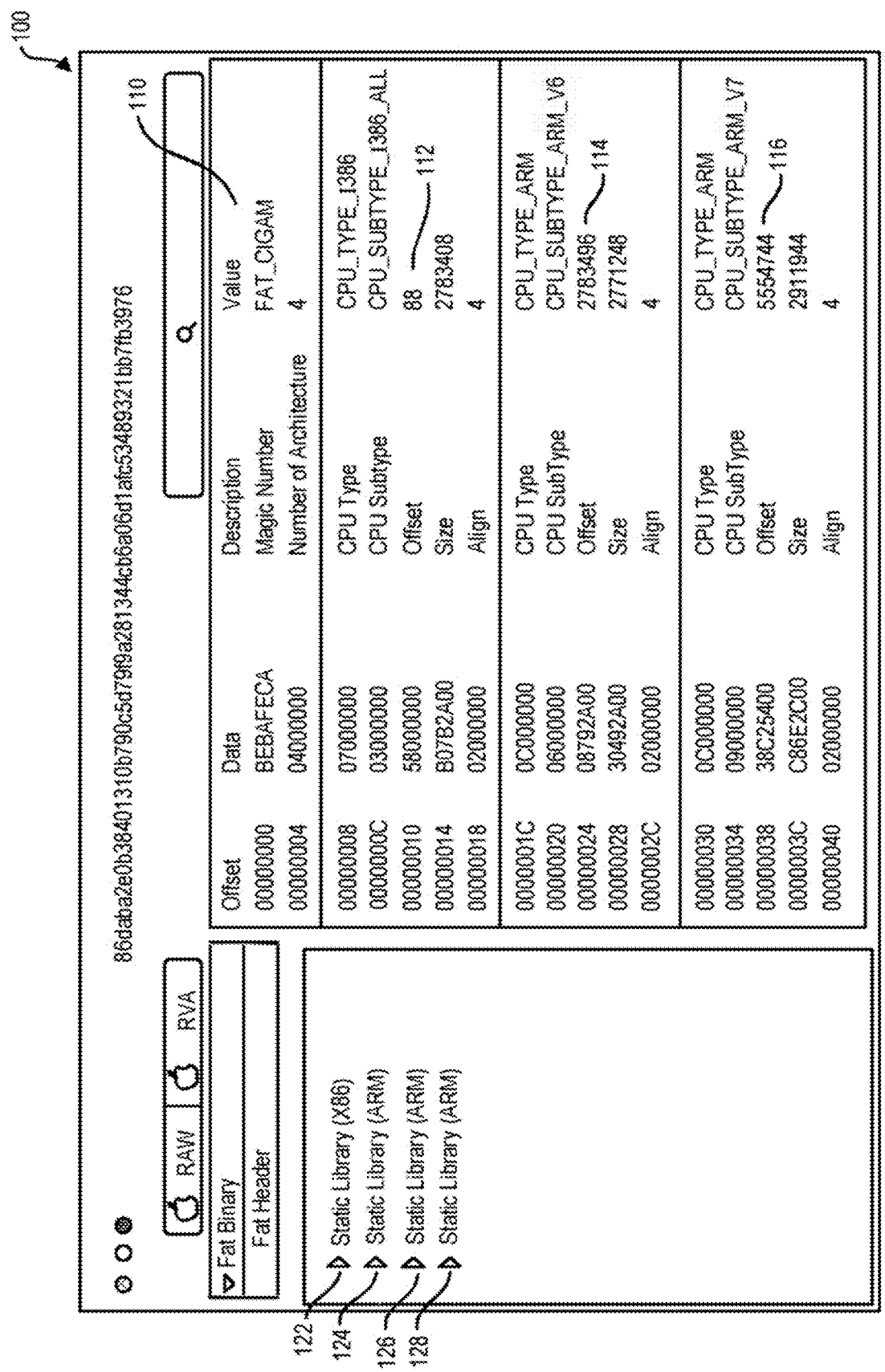
FIG. 1 depicts a container file, in accordance with some example embodiments.

The presence of a single malicious file may render, as noted above, an entire container file malicious. A malicious file may be a program that includes unwanted or unauthorized data or code and can exhibit unauthorized behavior including, for example, a computer virus, worm, Trojan horse, and spyware. Alternately or additionally, the combined presence of two or more files that are individually benign may also render a container file malicious as a whole. But analyzing a container file as a whole may be inefficient. At the outset, representing the container file as a whole may require an extended feature space that concatenates all features (e.g., file name, file path or location, size, creator, owner, embedded Universal Resource Locator (URL)) from every constituent file. Moreover, two container files may store identical or similar sets of files in a different order. As such, container files that are functionally similar or identical may be associated with different feature space representations. Consequently, a container file may be misclassified because its feature space representation fails to correlate with that of one or more known (e.g., malicious or benign) container file.

In some example embodiments, classifying a container file may include utilizing a machine learning model configured to analyze the files individually. For example, the machine learning model may be a neural network including, for example, a convolutional neural network (CNN) and/or the like. It should be appreciated that any type of machine learning model may be used without departing from the scope of the present disclosure. Furthermore, it should be appreciated that in addition to the presence of one or more files that renders the container file malicious, the container file may be classified further based on one or more features associated with the file including, for example, an icon associated with the container file, a size of the container file, one or more strings (e.g., of characters and/or binary digits) included in the container file, metadata associated with the container file, a type of the container file, behavior of the container file (e.g., effects executing the container file), and/or the like.

A convolutional neural network may be a neural network having a feed-forward architecture. The convolutional neural network may apply, to input data (e.g., a container file), a plurality of kernels adapted to process and extract information from portions of the input data. For example, the convolutional neural network can be configured to extract information from individual sub-files within a container file. The information from individual sub-files may be combined and further processed to determine a more abstract and better representation of the input data. This representation of the input data may be used to determine whether the container file includes one or more malicious sub-files.

For instance, the convolutional neural network may include at least one convolutional layer having one or more learnable kernels configured to detect certain combinations of features in overlapping groups of two or more files. The convolutional neural network may further include a pooling layer configured to identify the most prominent (e.g., maximum) features from across the files. A classification of the container file may be determined based on the most prominent features found in the files of the container file.

In some example embodiments, a convolutional neural network may be trained to classify container files (e.g., as malicious or benign). For instance, training the convolutional neural network may include utilizing the convolutional neural network to process one or more training files. One or more supervised learning techniques may be applied to train the convolutional neural network including, for example, backpropagation of errors. In addition, one or more optimization techniques (e.g., gradient descent) may be performed in order to minimize an error in the classifications of the training files generated by the convolutional neural network relative to the correct classifications for the training files. According to some example embodiments, the trained convolutional neural network may be provided in order to classify one or more unknown container files (e.g., as malicious or benign).

FIG. 1 depicts a container file 100, in accordance with some example embodiments. Referring to FIG. 1, the container file 100 may be a Mach object file that is targeted at one or more architectures including, for example, 32-bit and 64-bit Performance Optimization with Enhanced Reduced Instruction Set Computer (RISC) Performance Computing (PowerPC) processors, and 32-bit and 64-bit Intel x86 processors. As such, the container file 100 may include one or more files (e.g., images) that provide the appropriate code for different architectures. Each file may be stored as a continuous set of bytes at an offset from a beginning of the container file 100.

The container file 100 may include a header 110, which may provide information (e.g., a first offset 112, a second offset 114, a third offset 118) that allows a runtime tool associated with a particular architecture (e.g., PowerPC or Intel) to locate the files containing the appropriate code for that architecture. As shown in FIG. 1, the container file 100 includes a static library for four different architectures. Accordingly, the container file 100 may include one or more files for each architecture including, for example, a first file 122, a second file 124, a third file 126, and a fourth file 128. However, the container file 100 may include a different number of files than shown without departing from the scope of the present disclosure. Moreover, it should be appreciated that one or more of the first file 122, the second file 124, the third file 126, and the fourth file 128 may be a container file without departing from the scope of the present disclosure.

In some example embodiments, a feature space that includes an f number of features may be required to represent each file in the container file 100 (e.g., the first file 122, the second file 124, the third file 126, and the fourth file 128). Accordingly, if the container file 100 includes an n number of files, then the container file 100 may be represented by concatenating the f number of features from each of the n number of files to form an n×f feature space. But using an n×f feature space to represent the container file 100 as a whole may be inefficient. For instance, a vector space having 100,000 features may be required to represent the container file 100 if the container file 100 includes 1,000 files and 1,000 features are used to represent each object file. Moreover, the container file 100 may fail to correlate with other functionally similar or identical container files if the respective feature space representations of the container files are not aligned in a same order.

Figure 2A:
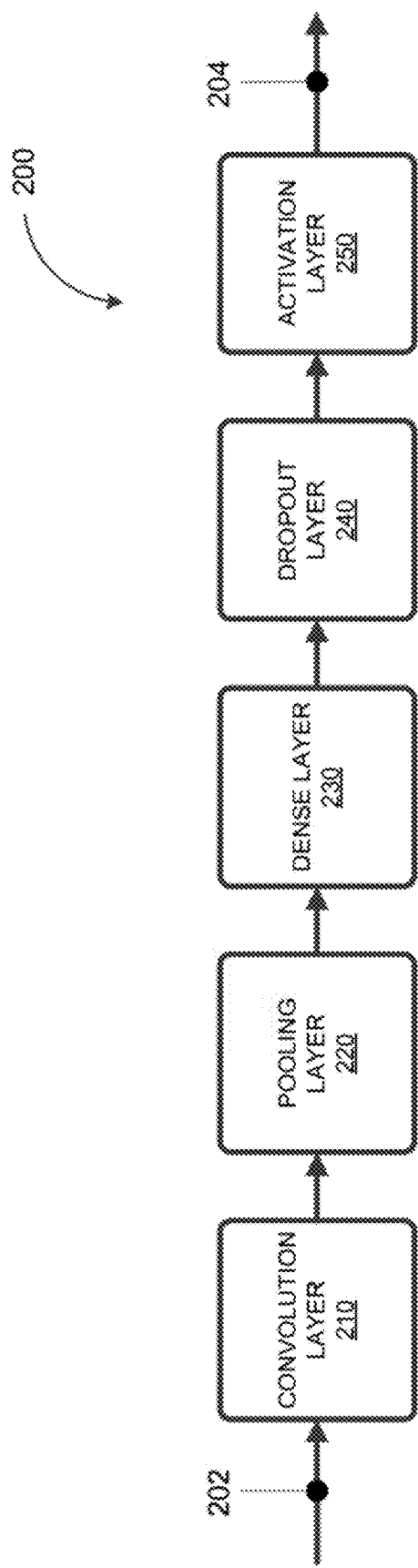
FIG. 2A depicts a convolutional neural network, in accordance with some example embodiments.
Figure 2B:
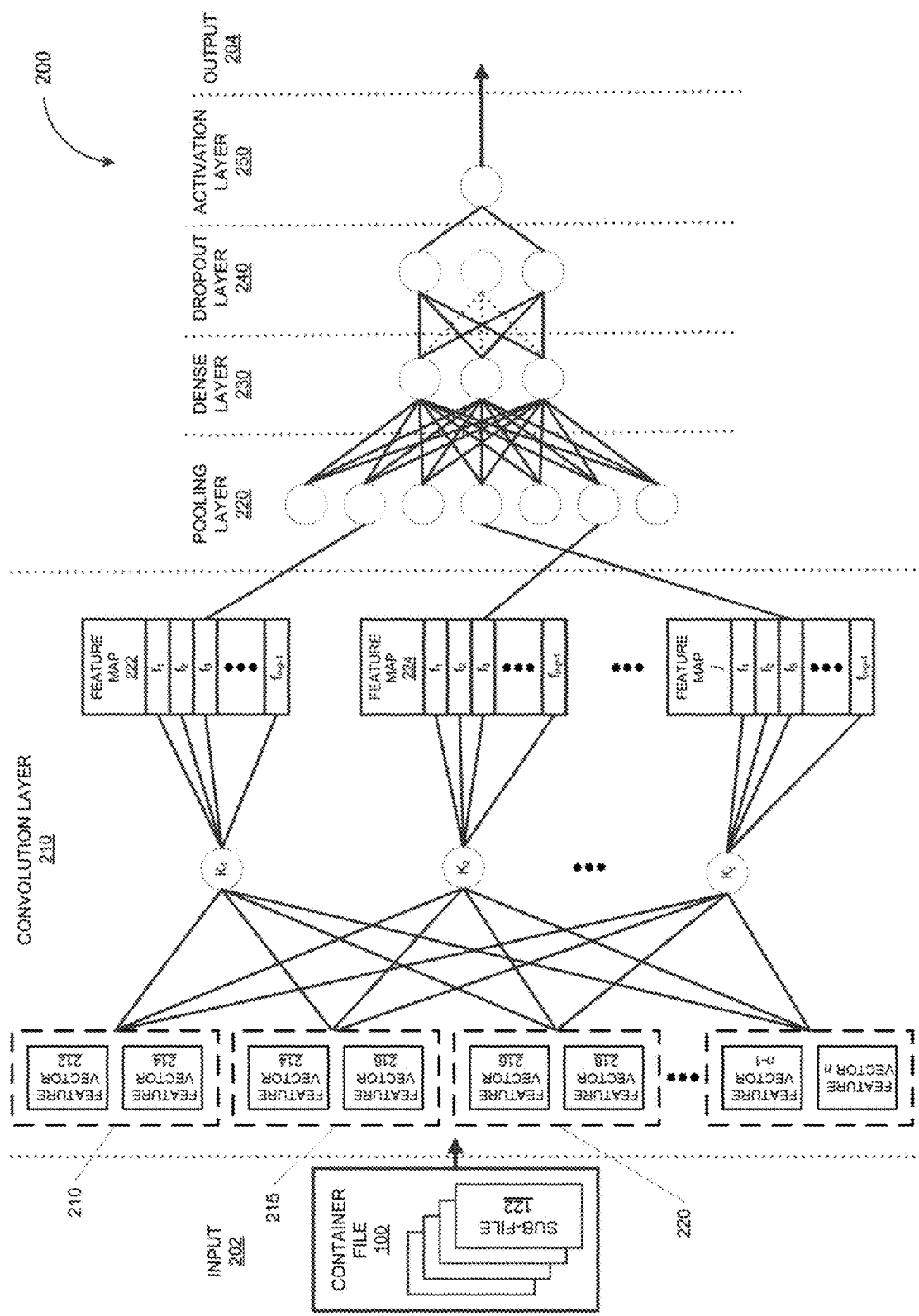
FIG. 2B depicts a convolutional neural network, in accordance with some example embodiments.

FIGS. 2A-B depict a convolutional neural network 200, in accordance with some example embodiments. Referring to FIGS. 1-2B, the operations of the convolutional neural network 200 may be performed in separate stages that correspond to individual layers. As shown in FIGS. 1-2B, the convolutional neural network 200 may include a convolution layer 210, a pooling layer 220, a dense layer 230, a dropout layer 240, and an activation layer 250. One or more operations may be performed at each of the convolution layer 210, the pooling layer 220, the dense layer 230, the dropout layer 240, and the activation layer 250 in order to process and classify a container file (e.g., the container file 100).

In some example embodiments, the convolutional neural network 200 may be utilized to process the container file 100. The container file 100 may include an n number of files including, for example, the first file 122, the second file 124, the third file 126, and the fourth file 128. As such, the convolutional neural network 200 may receive, at an input 202, a plurality of feature vectors representing files included the container file 100. For instance, as shown in FIG. 2B, the convolutional neural network 200 may receive an n number of feature vectors including, for example, a first feature vector 212, a second feature vector 214, a third feature vector 216, and a fourth feature vector 218.

Each feature vector may include one or more features of a corresponding container file including, for example, a filename, path or location, size, owner, creator, embedded Universal Resource Locators (URLs), and/or any other type of data characterizing or associated with the container file. For instance, the first feature vector 212 may include one or more features of the first file 122 while the second feature vector 214 may include one or more features of the second file 124. The features in each feature vector may a representation a corresponding file that summarizes the contents of that file. For instance, the features included in the feature vectors may include, for example, strings, n-grams, entropies, and file size. According to some example embodiments, the files of the container file 100 may be transformed into the n number of feature vectors by one or more techniques including, for example, feature engineering and feature learning.

According to some example embodiments, the convolution layer 210 may be configured to process the plurality of feature vectors in overlapping groups of two or more feature vectors. That is, the convolution layer 210 may process the plurality of feature vectors in groups where each group may include at least one feature vector that is also included in one or more other groups. The number of feature vectors that overlap between successive groups of feature vectors may correspond to a stride of the convolution neural network 200. For example, each group of feature vectors may include a g number of feature vectors. Thus, to process the n number of feature vectors, the convolution layer 210 may process an (n–g–1) number of groups of feature vectors where each group includes a g number of feature vectors.

As shown in FIG. 2B, the convolution layer 210 may process the plurality of feature vectors in overlapping groups of two feature vectors. Accordingly, the first feature vector 212 and the second feature vector 214 may be processed together in a first vector group 210 while the second feature vector 214 and the third feature vector 216 may be processed together in a second vector group 215. The third feature vector 216 and the fourth feature vector 218 may be processed together in a third vector group 220. Alternately, the convolution layer 210 may process the plurality of feature vectors in overlapping groups of three feature vectors. In this scenario, the convolution layer 210 may process the first feature vector 212, the second feature vector 214, and the third feature vector 216 together in one group. Meanwhile, the convolution layer 210 may process the second feature vector 214, the third feature vector 216, and the fourth feature vector 218 together in another group.

In some example embodiments, the convolution layer 210 may process the plurality of feature vectors and generate a plurality of feature maps by at least applying one or more kernels to each overlapping group of feature vectors. For instance, as shown in FIG. 2B, the convolution layer 210 may apply a j number of different kernels (e.g., the kernels $K_1, K_2, \ldots, K_j$) to each overlapping group of two or more feature vectors including, for example, the first vector group 210, the second vector group 215, and the third vector group 220. As shown in FIG. 2B, the convolution layer 210 may apply the kernel $K_1$ to at least the first vector group 210, the second vector group 215, and the third vector group 220. Similarly, the convolution layer 210 may apply the kernel $K_2$ to at least the first vector group 210, the second vector group 215, and the third vector group 220.

Each of the j number of kernels may include a combination of features. Applying a kernel to a group of feature vectors may include computing a dot product between the features included in the kernel and the features included in the group of feature vectors. As such, the application of the kernels may identify prominent features in the group of feature vectors (e.g., across two or more files in the container file 100). According to some example embodiments, each of the j number of kernels applied at convolution layer 210 may be associated with a weight $W_j$ and/or bias $B_j$, which may be adjusted when training the convolutional neural network 200.

The prominent features from each group of feature vectors may be included in a feature map associated with that kernel. For instance, applying the kernel $K_1$ to the first vector group 210 may identify prominent features in the first vector group 210 (e.g., in the first feature vector 212 and the second feature vector 214). Similarly, applying the kernel $K_1$ to the second vector group 215 and the third vector group 220 may also identify prominent features in these vector groups. These prominent features may be included in a first feature map 222.

As shown in FIG. 2B, the convolution layer 210 may further apply the kernel $K_2$ to at least the first vector group 210, the second vector group 215, and the third vector group 220. Applying the kernel $K_2$ may identify additional prominent features in the first vector group 210, the second vector group 215, and the third vector group 220. The prominent features that are identified by applying the kernel $K_2$ may be included in a second feature map 224.

A feature map (e.g., the first feature map 222, the second feature map 224) that is generated by applying a kernel $K_j$ may be denoted as follows:

$$W_j X + B_j,$$

wherein X may refer to the overlapping groups of feature vectors, and wherein $W_j$ may be a weight matrix of the corresponding kernel $K_j$.

Referring again to FIGS. 2A-B, the convolutional neural network 200 is shown to include single convolution layer (e.g., the convolution layer 210). However, the convolutional neural network 200 may include additional convolution layers without departing from the scope of the present disclosure. For instance, each additional convolution layer may apply different kernels, which may include larger and/or more complex combination of features.

In some example embodiments, the feature maps (e.g., the first feature map 222, the second feature maps 224) generated at convolution layers (e.g., the convolution layer 210) may be further processed by the pooling layer 220. The pooling layer 220 may identify maximum features from across all n number of feature vectors (e.g., across all files in the container file 100). For instance, the pooling layer 220 may identify the maximum features by at least applying the following maximum pooling function to each feature map (e.g., the first feature map 222, the second feature map 224):

$$f'_{i,i \in [0,1,\ldots,j]} = \max_{k,k \in [0,1,\ldots,n]} f_{i,j},$$

wherein f denotes a value prior to application of the maximum pooling function and f' denotes a value that has been subject to the maximum pooling function.

The maximum features identified by the pooling layer 220 may be further processed by the dense layer 230, which may be a fully connected layer. The output from the dense layer 230 may be further processed by the dropout layer 240. In some example embodiments, the dropout layer 240 may be configured to drop out (e.g., randomly) at least a portion (e.g., half) of the output from the dense layer 230 in order to remove sampling noise introduced by the previous layers of the convolution neural network 200 (e.g., the convolution layer 210, the pooling layer 220) and prevent overfitting at the activation layer 250.

In some example embodiments, the activation layer 250 may generate the output 204 by at least applying one or more activation functions to the output from the dropout layer 240. For instance, the activation layer 250 may apply the following rectifier or ramp function to the output from the dropout layer 240.

$$f(x) = \max(0, x),$$

wherein x may be an output from the dropout layer 240 that is input into the activation layer 250.

In some example embodiments, the output 204 of the convolutional neural network 200 may be a classification of the container file 100. For instance, the convolutional neural network 200 may provide a classification of the container file 100 (e.g., as malicious or benign) based on the prominent features that are identified from across the n number of files in the container file 100. According to some example embodiments, the convolutional neural network 200 may be trained to classify container files (e.g., as malicious or benign) by at least utilizing the convolutional neural network 200 to process a plurality of training files. A training file may be a container file that is known to include at least one file rendering the container file malicious as a whole. For example, the training file may be a container file that is known to include at least one malicious file. The malicious file may be unwanted data, an unwanted portion of a script, and/or an unwanted portion program code. Alternately or additionally, the training file may be a container file that is known to include two or more files that are individually benign but render the container file malicious as a combination. For instance, GNU Privacy Guard (GnuPG), Roshal Archive (RAR), cURL, and SysInternals SDelete may all be individually benign files having legitimate utility. However, a container file that includes these files may be malicious as a whole (e.g., a ransomware package). One or more supervised learning (e.g., backward propagation of errors) and optimization techniques (e.g., gradient descent) may be used to minimize an error in the output 204 relative to a correct classification of the training files.

Figure 3:
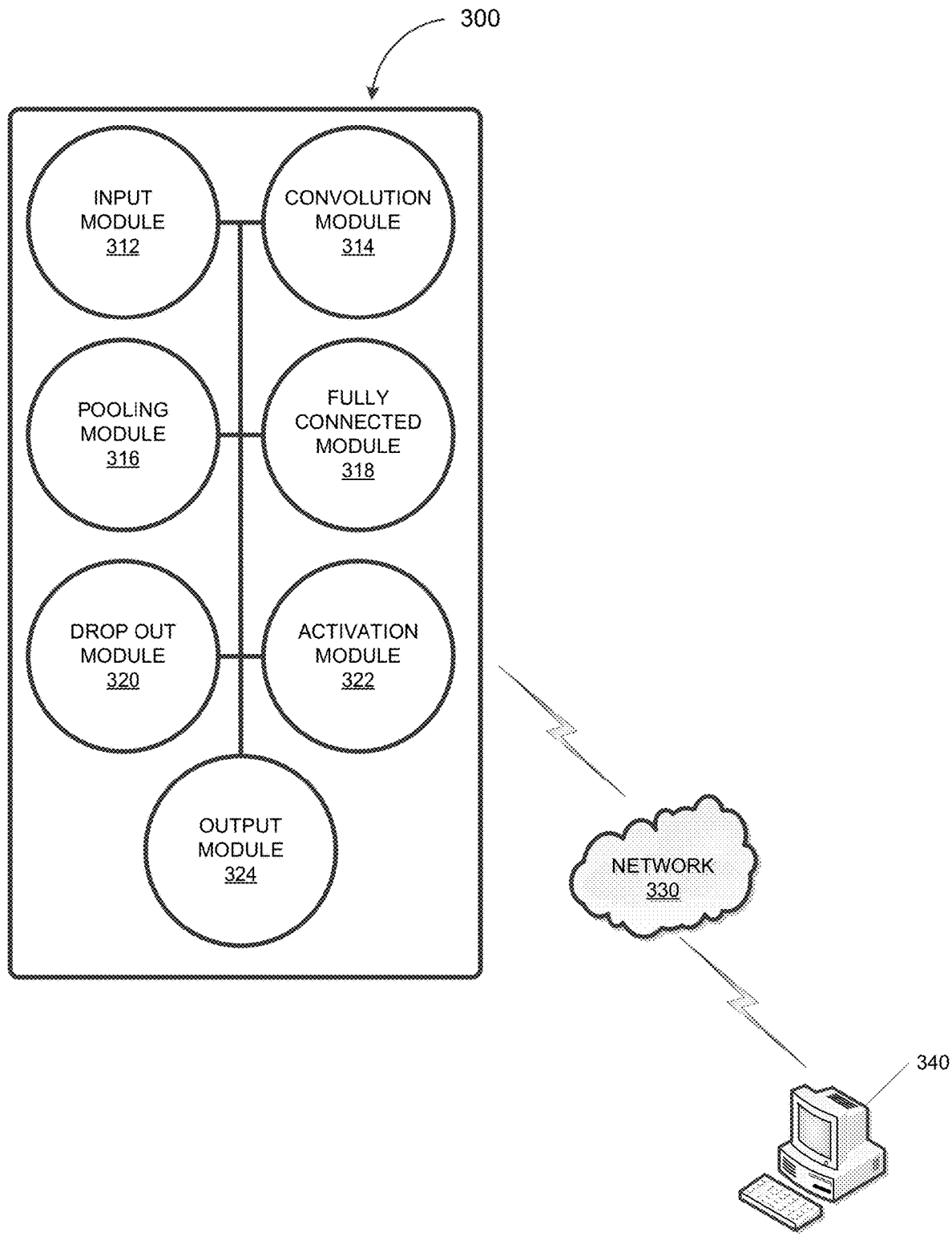
FIG. 3 depicts a block diagram illustrating a neural network system, in accordance with some example embodiments.

FIG. 3 depicts a block diagram illustrating a neural network system 300, in accordance with some example embodiments. Referring to FIGS. 1-3, the convolutional neural network system 300 may implement the convolutional neural network 200.

In some example embodiments, the neural network system 300 may be realized in digital electronic circuitry, integrated circuitry, specially designed application specific integrated circuits (ASICs), field programmable gate arrays (FPGAs) computer hardware, firmware, software, and/or combinations thereof. As shown in FIG. 3, the neural network system 300 can include an input module 312, a convolution module 314, a pooling module 316, a fully connected module 318, a drop out module 320, an activation module 322, and an output module 324. The neural network system 300 may further be communicatively coupled with one or more devices including, for example, a device 340. The neural network system 300 may communicate with the device 340 via a wired and/or wireless network 330 (e.g., a wide area network (WAN), a local area network (LAN), and/or the Internet).

The input module 312 may be configured to receive feature vectors corresponding to the files in one or more container files (e.g., the container file 100). Alternately, in some example embodiments, the input module 312 may be configured to receive one or more container files (e.g., the container file 100) and generate feature vectors for each file in the one or more container files. For instance, the input module 312 may be configured to apply feature engineering and/or feature learning to identify features in the first file 122 that summarize the first file 122. In doing so, the input module 312 may generate the first feature vector 212, which includes the features summarizing the corresponding first file 122. According to some example embodiments, the input module 312 may be configured to receive the container files and/or feature vectors from the device 340. The container files and/or feature vectors may be training data and/or actual input data.

The convolution module 314 may receive, from the input module 312, a plurality of feature vectors (e.g., the first feature vector 212, the second feature vector 214, the third feature vector 216, and the fourth feature vector 218). In some example embodiments, the convolution module 314 may be configured to process the plurality of feature vectors by at least applying one or more kernels to overlapping groups of input vectors. The application of the kernels to the overlapping groups of input vectors may generate a corresponding plurality of feature maps. For example, the convolution module 314 may generate the first feature map 222 by at least applying the kernel $K_1$ to the first vector group 210, the second vector group 215, and the third vector group 220. The convolution module 314 may further generate the second feature map 224 by at least applying the kernel $K_2$ to the first vector group 210, the second vector group 215, and the third vector group 220.

In some example embodiments, the pooling module 316 may be configured to down sample the feature maps generated by the convolution module 314. For instance, the pooling module 316 may apply a maximum pooling function to each feature map (e.g., first feature map 222, the second feature map 224) in order to identify the most prominent (e.g., maximum) feature in each feature map. The prominent features identified by the pooling module 316 may be further processed by the fully connected module 318. Meanwhile, output from the fully connected module 318 may be further processed by the dropout module 320. For instance, the dropout module 320 may be configured to drop out (e.g., randomly) at least a portion (e.g., half) of the output received from the fully connected module 318 in order to remove sampling noise introduced by other modules of the neural network system 300 (e.g., the convolution module 314, the pooling layer 316) and prevent overfitting at the activation module 322.

In some example embodiments, the activation module 322 may generate an output of the neural network system 300 by at least applying one or more activation functions (e.g., rectifier function) to the output received from the dropout module 320. The output of the neural network system 300 may be a classification of a container file (e.g., the container file 100) as malicious or benign. The output module 324 may be configured to provide the output of the neural network system 300 by at least transmitting the output to the device 340 (e.g., via the network 330).

Figure 4:
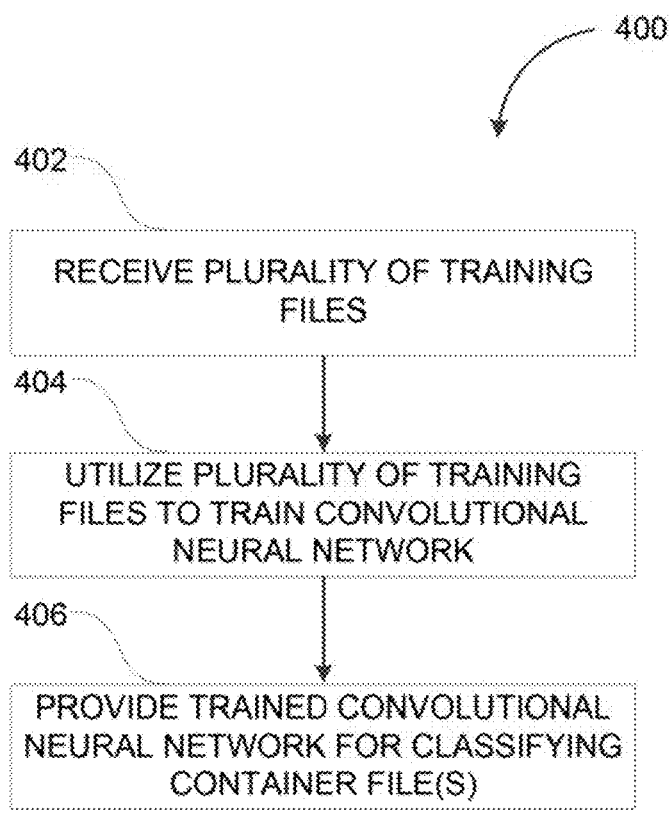
FIG. 4 depicts a flowchart illustrating a process for training a conventional neural network to classify container files, in accordance with some example embodiments.

FIG. 4 depicts a flowchart illustrating a process 400 for training a convolutional neural network, in accordance with some example embodiments. Referring to FIGS. 1-4, the process 400 may be performed by the neural network system 300 to train the convolutional neural network 200.

The neural network system 300 may receive a plurality of training files (402). For example, the neural network system 300 may receive one or more training files from the device 340 and/or another source. The one or more training files can be used to train the neural network to detect whether a container file includes at least one file rendering the container file malicious as whole. For instance, the neural network may be trained to detect the presence of a single malicious file or the combined presence of two or more files that are individually benign. In some example embodiments, the training files may be container files including, for example, the container file 100. Moreover, the training files may be container files that are known to include at least one malicious file. Alternately or additionally, the training files may be container files that are known to include two or more benign files are malicious as a combination.

As such, each training files may include multiple files. For example, the container file 100 may include the first file 122, the second file 124, the third file 126, and the fourth file 128. The training files may further be accompanied by a correct classification (e.g., as malicious or benign) for each training file. In some example embodiments, at least one of the first file 122, the second file 124, the third file 126, and the fourth file 128 may be malicious, thereby rendering the container file 100 malicious as a whole. Alternately or additionally, two or more of the first file 122, the second file 124, the third file 126, and the fourth file 128 may be benign individually but malicious when combined. For example, the first file 122 and the second file 124 may both be benign files. However, the combination of the first file 122 and the second file 124 in the container file 100 may render the container file 100 malicious.

The neural network system 300 may utilize the plurality of training files to train the convolutional neural network 200 (404). For example, the neural network system 300 may train the convolutional neural network 200 by at least utilizing the convolutional neural network 200 to process the training files. In some example embodiments, the convolutional neural network 200 may be adapted to process feature vectors corresponding to the files in each training file. For instance, the convolutional neural network 200 may process the first feature vector 212, the second feature vector 214, the third feature vector 216, and the fourth feature vector 218. These feature vectors may respectively correspond to the first file 122, the second file 124, the third file 126, and the fourth file 128 of the container file 100.

For each training file, an error associated with the classification of the training file relative to a correct classification of the training file may be back propagated through the convolutional neural network 200 to generate a loss function. Gradient descent may be performed in order to determine one or more optimizations to the convolutional neural network 200 (e.g., the weights $W_j$ and/or biases $B_j$ applied at the convolution layer 210) that would minimize the loss function. In some example embodiments, training the convolutional neural network 200 may include using the convolutional neural network 200 to process multiple training files. As such, the neural network system 300 may perform multiple iterations of optimizations (e.g., weight and/or bias adjustments) in order to generate a trained convolutional neural network 200.

The neural network system 300 may provide the trained convolutional neural network 200 for classifying one or more container files (406). For example, the trained convolutional neural network 200 may be deployed to process actual container files and provide a classification of the container files (e.g., as malicious or benign). In some example embodiments, the trained convolutional neural network 200 may be provided in any manner including computer software, dedicated circuitry (e.g., application specific integrated circuits (ASICs)), and/or over a cloud platform.

In some example embodiments, the trained convolutional neural network 200 may be updated by at least training the trained convolutional neural network 200 with additional training files. The additional training files may include different malicious files that the convolutional neural network 200 was not initially trained to detect. An updated version of the trained convolutional neural network 200 may be again deployed as computer software, dedicated circuitry (e.g., application specific integrated circuits (ASICs)), and/or over a cloud platform. Alternately or additionally, the trained convolutional neural network 200 may serve as the basis for a different (e.g., customized) convolutional neural network that is trained specifically to recognize certain malicious files. As such, one or more separate convolutional neural networks may be generated by training the trained convolutional neural network 200 with additional training files that include specific malicious files.

Figure 5:
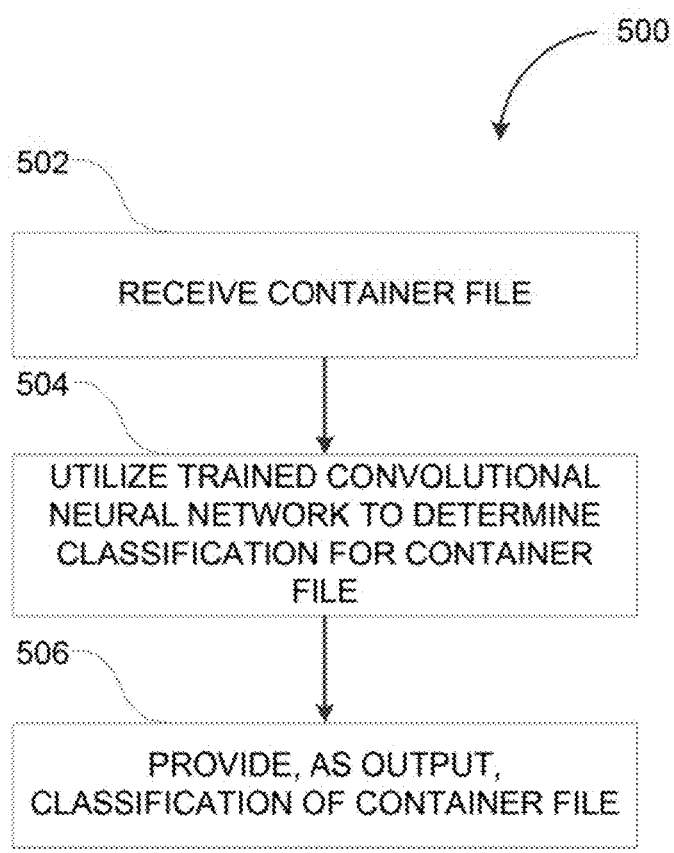
FIG. 5 depicts a flowchart illustrating a process for utilizing a trained convolutional neural network to classify container files, in accordance with some example embodiments.

FIG. 5 depicts a flowchart illustrating a process 500 for utilizing the trained convolutional neural network 200, in accordance with some example embodiments. Referring to FIGS. 1-5, in some example embodiments, the process 500 may be performed by the neural network system 300 to utilize the convolutional neural network 200 subsequent to training.

The neural network system 300 may receive the container file 100 (502). For example, the neural network system 300 may receive the container file 100 from the device 340 and/or another source. In some example embodiments, the container file may include a plurality of files including, for example, the first file 122, the second file 124, the third file 126, and the fourth file 128.

The neural network system 300 may utilize the trained convolutional neural network 200 to determine a classification for the container file 100 (504). For example, the neural network system 300 may utilize the convolutional neural network 200 to process the container file 100. In some example embodiments, the trained convolutional neural network 200 may be adapted to process the files of the container file 100 individually. That is, the trained convolutional neural network 200 may be configured to process the container file 100 by applying one or more kernels to the individual feature vectors that correspond to the files of the container file 100. The trained convolutional neural network 200 may be configured to apply (e.g., at the convolution layer 210) one or more weights and/or biases that have been optimized (e.g., during training) to minimize an error in the classification of the container file 100.

The neural network system 300 may provide, as an output, a classification of the container file 100 (506). For example, a result of the processing performed by the trained convolutional neural network 200 may be a classification of the container file 100 as malicious or benign. In some example embodiments, the neural network system 300 may provide the output to the device 340.

Implementations of the present disclosure can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital MRI image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein.

Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claim.

What is claimed is:

1. A system, comprising:
    at least one processor; and
    at least one memory including program code which when executed by the at least one processor provides operations comprising:
        processing a container file with a trained machine learning model comprising a trained neural network, wherein the trained machine learning model is trained to determine a classification for the container file indicative of whether the container file includes at least one file rendering the container file malicious, wherein the trained machine learning model is trained and configured to prevent misclassification for different container files storing identical or similar sets of files in a different order; and
        providing, as an output by the trained machine learning model, an indication of whether the container file includes the at least one file rendering the container file malicious.

2. The system of claim 1, wherein the at least one file rendering the container file malicious comprises a malicious file.

3. The system of claim 2, wherein the malicious file comprises unwanted data, an unwanted portion of a script, and/or an unwanted portion of program code.

4. The system of claim 1, wherein the at least one file rendering the container file malicious comprises a benign file rendering the container file malicious when combined with another benign file from the container file.

5. The system of claim 1, wherein the trained neural network comprises a trained convolutional neural network.

6. The system of claim 1, wherein the container file comprises a file that includes a plurality of files.

7. The system of claim 6, wherein the trained machine learning model comprises a pooling layer configured to apply a maximum pooling function to the container file, and wherein applying the maximum pooling function identifies a maximum feature from the plurality of files included in the container file.

8. The system of claim 7, further comprising:
    receiving the container file by at least receiving a plurality of feature vectors, and wherein each of the plurality of feature vectors includes one or more features of a corresponding one of the plurality of files.

9. The system of claim 8, wherein the trained machine learning model comprises a convolution layer configured to generate a first feature map by at least applying a first kernel to a plurality of overlapping groups of feature vectors.

10. The system of claim 9, wherein applying the first kernel includes computing a dot product between features included in the first kernel and features included in a first overlapping group of feature vectors to generate a first entry in the first feature map, and computing another dot product between features included in the first kernel and features included in a second overlapping group of feature vectors to generate a second entry in the first feature map.

11. The system of claim 10, wherein the computing of the dot product and the other dot product detects a presence of the features included in the first kernel in the first and second overlapping group of feature vectors.

12. A method, comprising:
    processing a container file with a trained machine learning model comprising a trained neural network, wherein the trained machine learning model is configured to determine a classification for the container file indicative of whether the container file includes at least one file rendering the container file malicious, wherein the trained machine learning model is trained and configured to prevent misclassification for different container files storing identical or similar sets of files in a different order; and
    providing, as an output, an indication of whether the container file includes the at least one file rendering the container file malicious.

13. The method of claim 12, wherein the at least one file rendering the container file malicious comprises a malicious file.

14. The method of claim 13, wherein the malicious file comprises unwanted data, an unwanted portion of a script, and/or an unwanted portion of program code.

15. The method of claim 12, wherein the at least one file rendering the container file malicious comprises a benign file rendering the container file malicious when combined with another benign file from the container file.

16. The method of claim 12, wherein the trained neural network comprises a trained convolutional neural network.

17. The method of claim 12, further comprising:
    applying, by the trained machine learning model, a maximum pooling function to the container file, wherein applying the maximum pooling function identifies a maximum feature from a plurality of files included in the container file.

18. The method of claim 17, further comprising:
    receiving the container file by at least receiving a plurality of feature vectors, and wherein each of the plurality of feature vectors includes one or more features of a corresponding one of the plurality of files.

19. The method of claim 18, further comprising:
    generating, by the trained machine learning model, a first feature map by at least applying a first kernel to a plurality of overlapping groups of feature vectors.

20. The method of claim 19, wherein the applying the first kernel includes computing a dot product between features included in the first kernel and features included in a first overlapping group of feature vectors to generate a first entry in the first feature map, and computing another dot product between features included in the first kernel and features included in a second overlapping group of feature vectors to generate a second entry in the first feature map.

21. The method of claim 20, wherein the computing of the dot product and the other dot product detects a presence of the features included in the first kernel in the first and second overlapping group of feature vectors.

22. A non-transitory computer-readable storage medium including program code which when executed by at least one processor causes operations comprising:
    processing a container file with a trained machine learning model comprising a trained neural network, wherein the trained machine learning model is configured to determine a classification for the container file indicative of whether the container file includes at least one file rendering the container file malicious, wherein the trained machine learning model is trained and configured to prevent misclassification for different container files storing identical or similar sets of files in a different order; and providing, as an output, an indication of whether the container file includes the at least one file rendering the container file malicious.

23. The non-transitory computer-readable storage medium of claim 22, wherein the trained neural network is a trained convolutional neural network.

24. The non-transitory computer-readable storage medium of claim 22, wherein the operations further comprise:

applying, by the trained machine learning model, a maximum pooling function to the container file, wherein applying the maximum pooling function identifies a maximum feature from a plurality of files included in the container file.

\* \* \* \* \*